Figure 1:
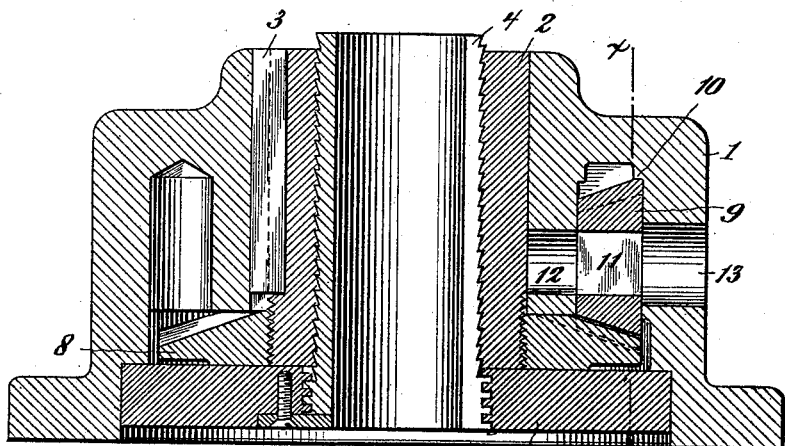

No. 638,905. Patented Dec. 12, 1899.
H. CASLER.
CHUCK.
(Application filed July 13, 1898.)
(No Model.) 2 Sheets—Sheet 1.

WITNESSES:

INVENTOR

BY

ATTORNEYS

No. 638,905. Patented Dec. 12, 1899.
H. CASLER.
CHUCK.
(Application filed July 13, 1898.)
(No Model.) 2 Sheets—Sheet 2.

WITNESSES: INVENTOR
ATTORNEYS

UNITED STATES PATENT OFFICE.

HERMAN CASLER, OF CANASTOTA, NEW YORK.

CHUCK.

SPECIFICATION forming part of Letters Patent No. 638,905, dated December 12, 1899.

Application filed July 13, 1898. Serial No. 685,823. (No model.)

*To all whom it may concern:*

Be it known that I, HERMAN CASLER, a citizen of the United States, residing at Canastota, in the county of Madison and State of New York, have invented certain new and useful Improvements in Chucks; and I do hereby declare the following to be a full, clear, and exact description of the invention, such as will enable others skilled in the art to which it appertains to make and use the same.

My invention relates to improvements in chucks; and it consists in the novel means employed for holding objects placed within the chuck and for centering the same automatically and in the novel combination, construction, and arrangement of the parts.

The objects of my invention are, first, to provide improved means for holding objects placed within the chuck and for automatically centering the same and which shall not score, indent, or otherwise injure the surfaces of such objects, and, second, to make the chuck simple and inexpensive in construction, compact, strong, durable, and not liable to derangement. These objects are attained in the chuck herein described, and illustrated in the drawings which accompany and form a part of this specification, in which the same reference-numerals indicate the same or corresponding parts, and in which—

Figure 2:
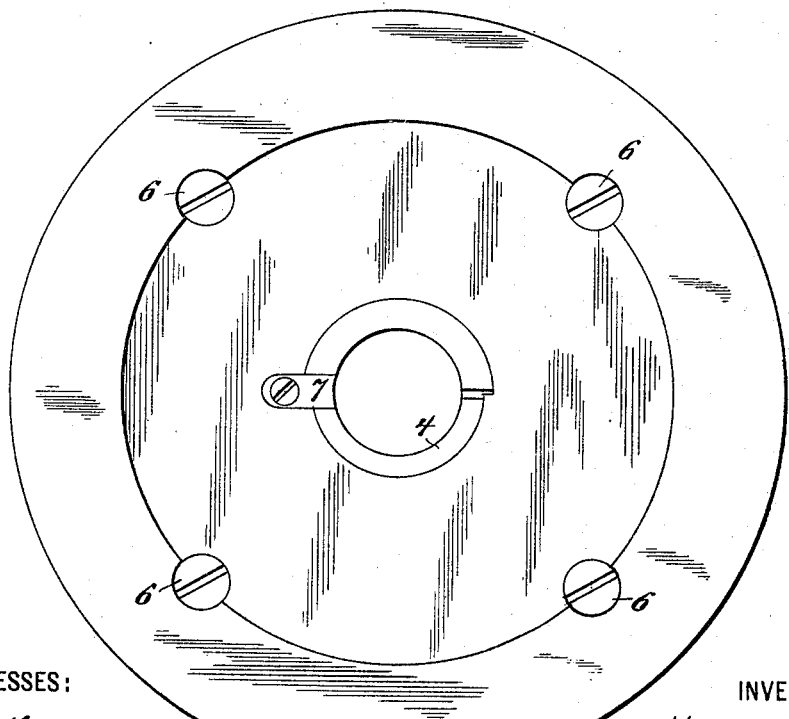
Figure 3:
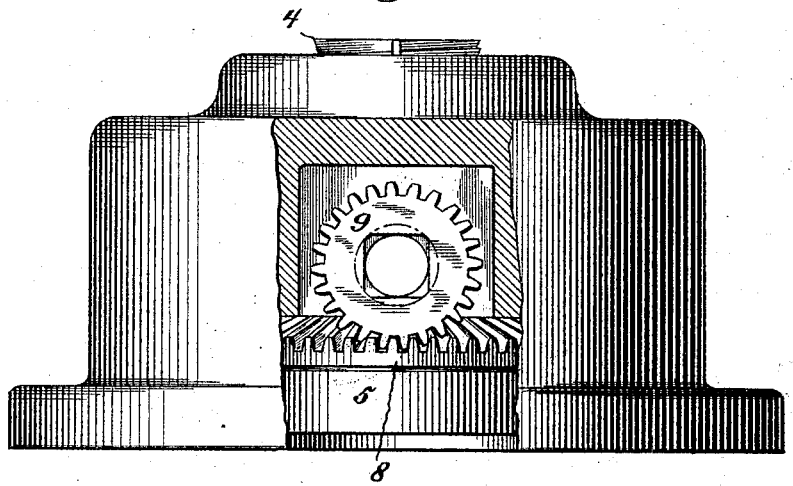
Figure 4:
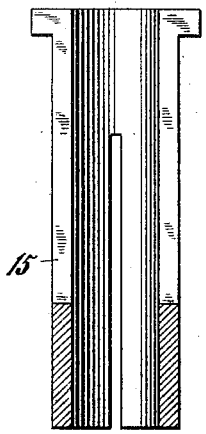
Figure 5:
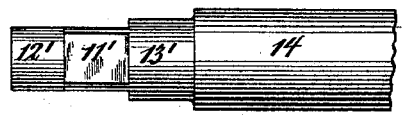

Figure 1 is a central longitudinal section of the chuck. Fig. 2 is a view of the rear end thereof. Fig. 3 is a side view and partial section of the chuck on the line $x\ x$ of Fig. 1. Fig. 4 is a longitudinal section of one of the liner-bushings hereinafter referred to and employed for adapting the chuck to receive objects having smaller diameters than any to which the gripping-bushing of the chuck may be reduced, and Fig. 5 is a detail view of the end of the key by which the chuck is operated.

The chuck herein illustrated and described is particularly adapted for holding work which has been turned to size, and is therefore particularly useful in finishing work, and more so as it does not score, indent, or otherwise injure the surfaces of objects held by it.

In the drawings, 1 is the main shell or casing of the chuck.

2 is a bushing mounted in the bore of the shell 1 and movable to some extent longitudinally therein, but held against rotary motion by a key 3.

4 is a comparatively thin split bushing within the bushing 2.

The bushings 2 and 4 are provided with engaging teeth, which for convenience in inserting the bushing 4 are preferably screw-teeth. These teeth act as wedges to contract the split bushing 4 when the bushing 2 is moved longitudinally toward the front end of the chuck, as hereinafter described, so causing the bushing 4 to grasp objects placed within it. The faces of these teeth therefore are inclined at a very oblique angle with the axis of the chuck. The wedge-teeth terminate a short distance from the end of the bushing 4, and in their stead the bushing 4 is provided with screw-teeth of rectangular form adapted to resist thrust and engaging corresponding teeth in a base-plate 5. This base-plate is secured to the main shell or casing 1 of the chuck by screws 6. (Shown in Fig. 2.) A key 7, secured to the base-plate 5 and engaging the bushing 4, prevents rotation of said bushing.

The casing 1 contains an annular chamber in front of the base-plate 5, within which is a bevel gear-wheel 8, having screw-threads engaging corresponding screw-threads of the bushing 2. A bevel-pinion 9, also within this annular chamber of the casing 1, engages the bevel-gear 8. The pinion 9 has no shaft or spindle, except as the key by which the chuck is operated forms a spindle temporarily, but is held in place, since it fits somewhat closely within the annular chamber in the casing 1, and is further held in engagement with the gear 8 by a shoulder 10 of the casing 1.

The keyhole 11 in the center of this pinion 9 has a square or other angular form. Opposite this keyhole 11 are round holes 12 and 13 in the walls of the casing 1. The key 14, by which the chuck is operated and the end of which is shown in Fig. 5, has portions 11', 12', and 13', corresponding in form to the form of the holes 11, 12, and 13, respectively. The portions 12' and 13' of the key 14 form journals therefor when the key is inserted into the chuck, so that the key is itself the supporting pin or spindle of the pinion 9 at the times when said pinion is to be rotated.

The operation of the chuck is as follows:

To contract the chuck about an object placed within the bushing 4, the key 14 is inserted into the keyhole in the pinion 9 and rotated. The motion thus imparted to the bevel-pinion 9 is communicated to the bevel-gear 8. The gear 8 is held between the casing 1 and the base-plate 5 and cannot move longitudinally, and therefore its rotation forces the bushing 2 outward or toward the top of Fig. 1. The split bushing 4 is held against longitudinal movement, however, by its screw-threads engaging the base-plate 5, and therefore its sides are pressed inward by the action of the wedge-shaped teeth of the bushing 2 against its corresponding teeth. The contraction of the bushing 4 thus produced is sufficient to cause said bushing to grasp objects placed within it which are of nearly the same diameter as the bore of the bushing when expanded. If the object to be held in the chuck be of considerably-smaller diameter than the bore of the bushing 4, a liner-bushing 15, such as is shown in Fig. 4, may be inserted, and the chuck may be provided with a number of these liner-bushings of different sizes, so that it may accommodate objects of different diameters. The liner-bushings are provided with longitudinal slots, as shown, so that they are readily expansible and contractible.

By a reverse operation to that above described the chuck may be opened to release any object placed within it.

Because the bushing 4 is itself centered with respect to the chuck and holds objects placed within it on all sides objects which have been turned to size are centered when held by the chuck. The same is true of the liner-bushings when they are employed.

Because the pressure of the bushing 4, or the liner-bushing, is exerted over so large a surface work is held firmly within the chuck without any scoring, indenting, or other injury to the surfaces of the work.

An important advantage of this chuck is that after an object has been clamped in it the position of such object is not altered by tightening the chuck, as is the case with many chucks. This is a great advantage when the end of an object held within the chuck is to be faced off or when a slot is to be cut in such object.

Having thus completely described my invention, what I claim, and desire to secure by Letters Patent, is—

1. In a chuck, the combination, with an elastic split bushing having wedge-shaped screw-threads, of a device for varying the diameter of said bushing, having corresponding and intermeshing wedge-shaped screw-threads coacting with the threads of the bushing, acting as wedges to cause the bushing to contract or to expand, when the said device is moved with respect to the bushing according to the direction of motion, said screw-threaded device being provided with means whereby it may be moved with respect to said bushing, substantially as described.

2. In a chuck, the combination, with an elastic split bushing having wedge-shaped screw-threads the working faces of which are set at an angle of less than forty-five degrees with respect to the axis of the bushing, whereby said threads are adapted to serve as wedges, of a device for varying the diameter of said bushing having corresponding and intermeshing wedge-shaped screw-threads which coact with the threads of the bushing, acting as wedges to cause the bushing to contract or to expand, when said device is moved with respect to the bushing, according to the direction of motion, said screw-threaded device being provided with means whereby it may be moved with respect to the bushing.

3. In a chuck, the combination, with a bushing of variable diameter provided with wedge-shaped screw-threads engaging corresponding threads of an object adapted to be moved longitudinally with respect to said bushing, and thereby to vary the diameter of the bushing, of a casing inclosing said bushing of variable diameter and said object, and means within and carried by the casing for imparting such longitudinal movement to said object, substantially as described.

4. In a chuck, the combination, with two concentric bushings, one located within the other, and provided with engaging wedge-shaped screw-threads, one of said bushings being of variable diameter and the other being adapted to be moved longitudinally with respect to said bushing of variable diameter, of a casing inclosing said bushings, and means within and carried by the casing for producing such longitudinal movement, substantially as described.

5. In a chuck, the combination, with a casing, and two bushings within said casing, one located within the other, and provided with engaging wedge-shaped screw-threads, one of said bushings being of variable diameter, of means for holding one of said bushings stationary within said casing, and means within and carried by the casing for producing longitudinal movements of the other bushing with respect to the stationary bushing, substantially as described.

6. In a chuck, the combination, with a casing, and two bushings within said casing, one located within the other, and provided with engaging wedge-teeth, one of said bushings being of variable diameter, of a base-plate engaging projections of one of said bushings and adapted to prevent longitudinal movement of said bushing, and means for producing longitudinal movement of the other bushing, substantially as described.

7. In a chuck, the combination, with a bushing of variable diameter provided with wedge-teeth engaging corresponding teeth of an object adapted to be moved longitudinally with respect to said bushing, and thereby to vary the diameter of the bushing, of a ring upon said object and connected thereto by screw-teeth, means for preventing longitudinal movement of said ring, and means for rotating said ring, thereby producing longitudinal movement of said object, substantially as described.

8. In a chuck, the combination, with a casing, and two bushings within said casing, one located within the other, and provided with engaging wedge-teeth, one of said bushings being of variable diameter, of means for holding one of said bushings within said casing, a bevel gear-wheel within said casing and mounted upon and connected to the other bushing by screw-teeth, a bevel-pinion engaging said bevel-gear, means for rotating said pinion, and means for preventing longitudinal movement of the bevel-gear, whereby when said gear is rotated longitudinal movement of its bushing is produced, substantially as described.

9. In a chuck, the combination, with a casing, and two bushings within said casing, one located within the other, and provided with engaging wedge-teeth, one of said bushings being of variable diameter, of means for holding one of said bushings within said casing, a bevel gear-wheel within said casing and mounted upon and connected to the other bushing by screw-teeth, a bevel-pinion engaging said bevel-gear and held in engagement therewith by a projecting shoulder of the casing, and provided with a suitable hole for the insertion of a key by which it may be rotated, the casing being provided with a bearing for the key when inserted into the pinion, and means for preventing longitudinal movement of the bevel-gear, whereby when said gear is rotated longitudinal movement of its bushing is produced, substantially as described.

In testimony whereof I affix my signature in presence of two witnesses.

HERMAN CASLER.

Witnesses:
ALBERT O. BRIGGS,
G. H. ROSE.